E. J. HAINAUT.
Mashing Apparatus.
No. 16,179.
Patented Dec. 9, 1856.
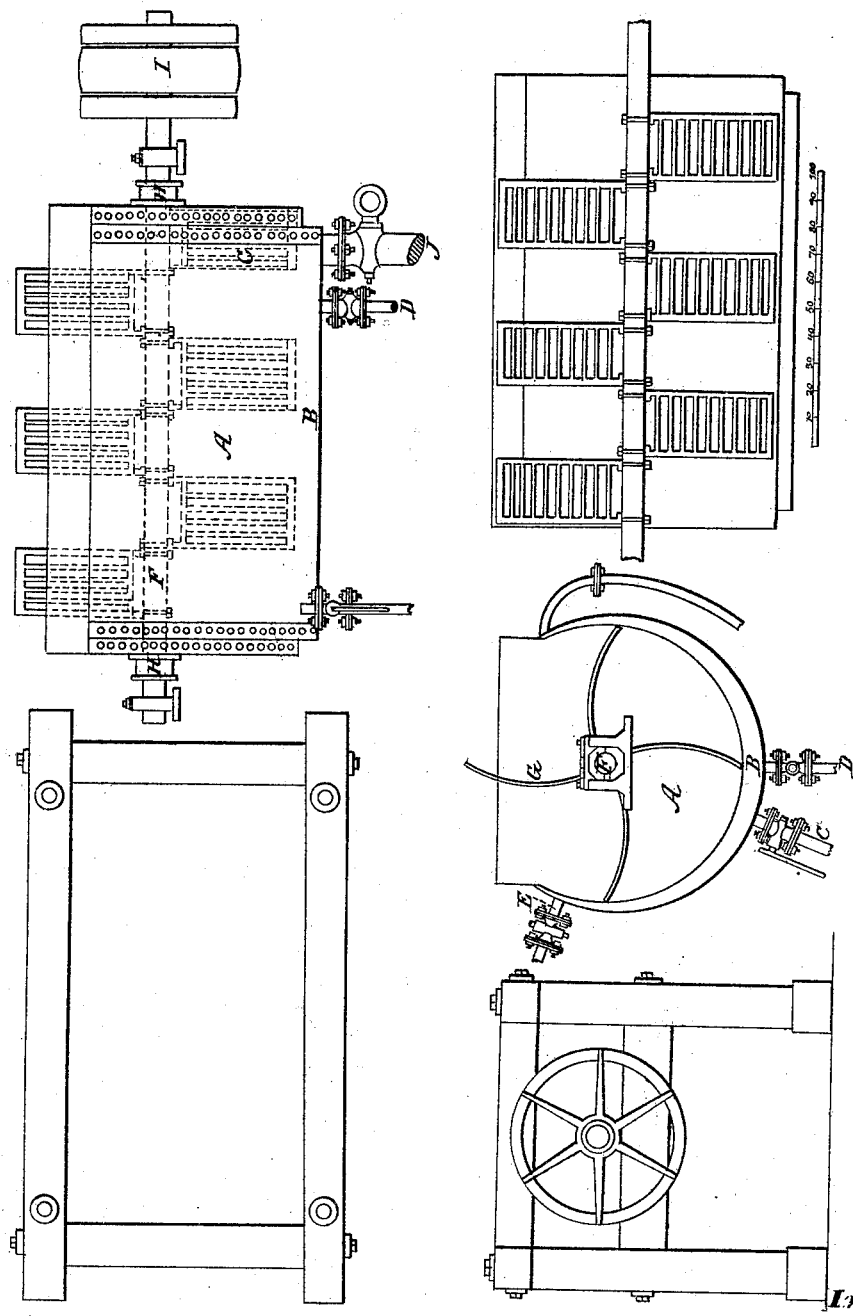

UNITED STATES PATENT OFFICE.

ELIE JOSEPH HAINAUT, OF THE KINGDOM OF BELGIUM.

PROCESS FOR MASHING GRAIN.

Specification of Letters Patent No. 16,179, dated December 9, 1856.

*To all whom it may concern:*

Be it known that I, ELIE JOSEPH HAINAUT, of the Kingdom of Belgium, have invented certain new and useful Improvements in Macerating Substances to be Employed in the Process of Distillation; and I hereby declare that the following is a full, clear, and exact description thereof.

The distillation of maize (Indian corn) and dairy or darhee (*sorghum sacharatum*) by the modes of macerating generally made use of for cereal grains presents serious difficulties which have not permitted till now, the profitable employment of these grains as substitutes for rye and barley: 1st because, the metal of those grains saccharifies itself but in an imperfect manner during the ordinary process of meceration and gives consequently but little density and alcoholic product relatively to the starch or fecula which it contains. 2dly because, after the dilution of the mass of macerated matter a considerable part of the meal of maize of dary, is precipitated to the bottom of the fermenting tub under the form of a deposit or sediment, similar to a sandy mass; this sediment produces little or no alcohol during the vinous fermentation and proves a great hindrance to the process of distillation, as it obstructs the corks of the tubs, the pipes of the pumps and the several divisions of the distilling apparatus; it also gathers and attaches itself to the bottom of the boiler when in contact with the fire and may cause dangerous accidents. To prevent these impediments and dangers there may be used: 1st the system of extraction analogous to that used by brewers, but the distiller will not find this advantageous; he will incur great loss of residuum and the main fault will always partially remain viz: incomplete saccharification and smaller yield of alcoholic product, than by my new method of maceration. 2dly diluting the meal of maize and of dary in a certain quantity of water at 50° or 60° centigrade and leaving it some time and then adding boiling water, in order to raise the mass of matter to a uniform temperature of 80° centigrade; this may succeed upon a small scale, but can never be reduced to profitable practice for reasons easily understood by persons acquainted with the art of distillation, of which reasons the principal is, that in the direct heating, by the addition of boiling water, the meal becomes lumpy and there being too great a mass to be properly fermented at the necessary temperature.

I shall now proceed with the description of my new method of macerating maize and dary, reference being had to the accompanying drawing, forming part of this specification and representing a macerating apparatus.

The letters of reference indicate the same parts in the different figures wherever they occur.

A is a semicylindrical copper or iron vessel proportioned in size to the quantity of meal to be macerated; B, double bottom or steam jacket, for the purpose of introducing steam to elevate or cold water to reduce the temperature of the diluted meal in the vessel; C, steampipe; D, outlet for steam or water; E, cold water pipe; F, horizontal shaft furnished with stirrers; H, stuffing boxes to prevent the loss of the matter; I, pulley, giving motion to the shaft; J, discharge pipe and cock.

*Manner of operating.*—Introduce into the macerator, about three liters (one liter is equal to 0.22 gallon) of water at the temperature of 60° centigrade per kilogram (2.26 lbs.) of the total quantity of the meal intended for maceration— the shaft, with the stirrers is to be set in motion and the meal of maize or of dary, separate or mixed together is introduced; after the complete mixing and keeping the shaft in motion, introduce the steam into the double bottom B, heat the whole mass to the temperature of 80° centigrade, which done, cut off the steam and stop the continuous stirring, though it is necessary every now and then to give motion to the shaft. The matter will have sunk to about 65° centigrade in from ¾ of an hour to an hour; this is the most favorable moment to add the malt viz: twenty or twenty-five kilos of the latter, to one hundred kilos of meal of maize or dary; when the whole is perfectly diluted and mixed, steam is again introduced in to the double bottom, to raise the whole mass of matter contained in the macerator to an equal temperature of 63° centigrade after one hour and a half or two hours maceration, the substance saccharified is let out from the macerator into the fermenting tub and a solution is added, consisting of one fourth of water and 3 fourths of the decanted liquids which was left for this operation a day or two days since and deriving from a previous operation. This liquid should be cool, in order to obtain a middle temperature of 27 or 28° centigrade; add now one kilo of beer yeast to one hundred kilos of macerated meal as diluted in the fermentation tub; after an hour and a half or two hours rest, the whole thick part of the matter will be found at the bottom of the tub and by means of taps or cocks placed over each other and at different heights, all the thin or clear liquid may be drawn off, taking care to let it run through a close sieve to separate the dirt or husks of grain from the clear liquid which runs out into a trough or a small cistern, whence it is drawn by means of a pump into a trough 30 or 35 centimeters high placed in a room over the fermentation room and situated in such a manner, that there may be kept up a permanent and equal temperature of 25 or 27° centigrade. About third part of the remaining liquid is laid by and used for a following fresh operation. Then there must be added per hectoliter (22 gallons) of drawn liquid and the thick substance remaining in the fermentation tub, about 200 grams or 6 ounces 8 pennyweights and 13 grains troy of pressed beer yeast diluted in a little quantity of suitable must and water; a perfect fermentation will take place in a few hours and the liquid is seen covered with a layer of white flaky foam which is the yeast.

After sixteen hours of fermentation proceed to gather this yeast by means of a large skimmer, this is repeated twice or three times, till the twentieth hour from the moment the fermentation commenced after which the liquid is returned into the fermentation tub, whence it had been drawn previously, where the alcoholic fermentation is completed, which will be terminated the following day viz: 48 hours after the maceration. The yeast thus gathered ought to be immediately diluted in three or four times its bulk of cold water, run through a close sieve into a tub, which is to be taken to a thoroughly cool place to settle or deposit during about twelve hours, after which the water is drawn off and the settled yeast put in bags which are brought under the press to squeeze out the little water it might contain. This yeast is white and almost without flavor or smell and contains a great power and property for the making of bread, for the fermentation of molasses, syrup and juice of beetroots; its principal merit is, that it imparts neither coloring, nor disagreeable flavor to the bread, a serious defect always found fault with, with the beer yeast. The yeast may also be procured and gathered from the fermenting tub itself; the meal intended for this object ought to be ground as thin as possible and bolted to clear it from the thickest bran.

The maceration and saccharine fermentation being performed as above described and the diluted matter being properly settled or deposited and the surface of the liquid being covered with a slight layer of white foam, the liquid instead of being drawn off or poured into another trough may by another equivalent manner of operating remain in the fermenting tub, it will be sufficient to mix it with the second gathering of yeast and to stir the mass anew. At the beginning of the saccharine fermentation it is necessary to remove with the skimmer the bran and other extraneous particles floating upon the surface of the liquid.

Fifteen or sixteen hours after the setting in of the fermentation a great quantity of yeast will be seen floating on the surface of the tub; this yeast being removed is washed and pressed as before mentioned the alcoholic fermentation is to be conducted in the above manner.

I propose thus: 1st. As grains proper for distillation, the maize and dary, to which I add the rice and the grain or sorgho, the pea, bean, and horse bean. The distiller may as he wishes use these different grains, separately or mixed together in divers proportions, provided he takes care to proceed in the process of saccharification according to my new mode of maceration, as above mentioned and that by means of 20 or 25% of malted barley, to which he may also add a certain quantity of rye as he may judge most profitable. 2dly. As a new method of macerating maize, dary, rice, fecula of potatoes or any other fecula, the previous dilution of the meal of these grains when performed in a vessel which can be heated by steam, and in preference, in the macerating machine to be heated by degrees and by simple contact as before described, and so as to give to the diluted mass of the meal a temperature of 80° centigrade taking care that it be not made lumpy and without addition of boiling water, in order to obtain the 80° without loading the overheated sides with crust.

I mention the temperature of 80° centigrade as the most convenient degree to predispose the meal to receive advantageously the saccharificating virtue of the diastaris contained in sprouted barley, which perfectly decomposes it during the course of maceration when it has previously been submitted to the temperature of 80° centigrade during a certain time, and after this brought again to 65° centigrade the whole mass of matter thickens and keeps in proper suspension during the course of the vinous fermentation, it will be found that the product of the alcohol from maize dary and rice, is equal and even superior to that of rye, and the inconvenience resulting from the deposits or sediments of the hot decomposed meal is no more to be feared, because the whole maintains itself in suspension and acts exactly, as the macerated rye with matted barley, according to the ordinary system. 3dly. As a new yeast particularly suitable and profitable to bakers that which I have mentioned as obtained from maize, dary rice, the grain of sorgho, the pea, bean, horse bean, fecula of potatoes or any other fecula, and which may be collected in abundance, when proceeding accordingly to either of my aforesaid two methods. The employment in distillation of all these different grains for the triple end of obtaining from them alcohol, superior yeast and an excellent sediment for feeding and fattening cattle, is new. There will be saved, by this system enormous quantities of rye, now diverted from its special and proper destination, that of supplying and feeding mankind, and which is by far more necessary and of general use than the grains employed in my system; this presents also the advantage of producing greater quantities of grain upon an equal space of ground and consequently at much inferior expense. 4thly. The whole of the sediment produced by this process of maceration as proper for feeding cattle and hogs.

I claim—

The within described process of mashing the grain or grains herein enumerated, either separately or combined as set forth for the triple purpose of obtaining alcohol, yeast designed to be dried and pressed and a mash sediment suitable for feeding cattle, the principal feature of which process consists in heating the said grain or grains in the macerator by steam applied externally in the manner herein described, instead of injecting the steam directly into the mass as has been heretofore the practice.

In testimony whereof I have signed my name to this specification before two subscribing witnesses.

E. J. HAINAUT.

Witnesses:
  H. RICHINSKI,
  A. POLLAK.